Figure 1:
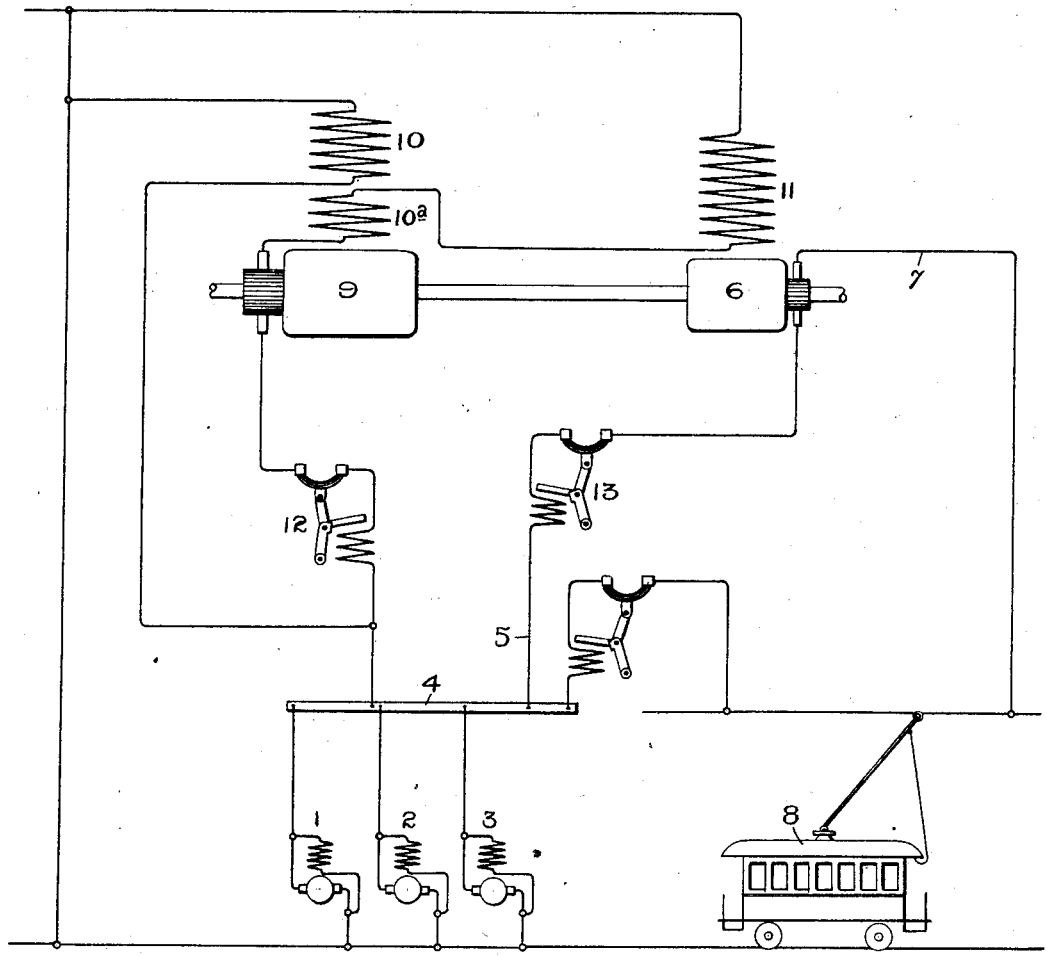

No. 731,000. PATENTED JUNE 16, 1903.
M. J. WIGHTMAN.
CONTROLLING ELECTRIC BOOSTERS.
APPLICATION FILED JUNE 5, 1901.
NO MODEL. 2 SHEETS—SHEET 1.

Witnesses:
Marcus L. Byng.
Benjamin B. Hull.

Inventor:
Merle J. Wightman,
by Albert S. Davis
Att'y.

No. 731,000. PATENTED JUNE 16, 1903.
M. J. WIGHTMAN.
CONTROLLING ELECTRIC BOOSTERS.
APPLICATION FILED JUNE 5, 1901.
NO MODEL. 2 SHEETS—SHEET 2.

Witnesses:
Marcus L. Byng.
Benjamin B. Hull.

Inventor:
Merle J. Wightman,
by Albert G. Davis
Att'y

No. 731,000. Patented June 16, 1903.

UNITED STATES PATENT OFFICE.

MERLE J. WIGHTMAN, OF WEST NEW BRIGHTON, NEW YORK, ASSIGNOR TO GENERAL ELECTRIC COMPANY, A CORPORATION OF NEW YORK.

CONTROLLING ELECTRIC BOOSTERS.

SPECIFICATION forming part of Letters Patent No. 731,000, dated June 16, 1903.

Application filed June 5, 1901. Serial No. 63,209. (No model.)

*To all whom it may concern:*

Be it known that I, MERLE J. WIGHTMAN, a citizen of the United States, residing at West New Brighton, in the county of Richmond and State of New York, have invented certain new and useful Improvements in Controlling Electric Boosters, of which the following is a specification.

In operating constant-potential systems of electrical distribution it is common to employ electromotive-force devices between the generator and the distributing-network to raise the potential on particular wires or feeders in order to compensate for decrease of potential due to excessive load on such wires or feeders. These devices are commonly electrodynamic boosters, which are generally placed in the station to compensate for the drop over a long feeder or from increase of load. These devices are sometimes engine-driven and sometimes operated by electric motors. When motor-driven, any damage to the motor which destroys its driving power—as, for instance, an opening of the switch controlling the motor-circuit or a throwing of its circuit-breaker or other accident tending to stop it—leaves the booster without a driving power, and under the current of the feeder-circuit it reverses and becomes a motor and being commonly a series-wound device rapidly accumulates speed until it is torn apart by centrifugal force.

It is the object of my invention to prevent such disastrous consequences, and I provide means for automatically protecting the booster from "running away," as it is called, in case the driving-motor ceases to operate. In carrying out the invention I prefer to dispense with the series field commonly provided for boosters and employ instead a field-winding connected in the circuit of the driving electric motor. By this means if the motor-circuit opens, or its armature burns out, or motor-current is interrupted in any way the field-magnet becomes deënergized and the booster comes to a stop. In some cases, as where a considerable lead must be given to the brushes to insure the best operation of the booster, I provide a few opposing turns on the field-magnet connected in the feeder-circuit, so as to counteract the tendency to magnetize the field-magnet from armature reaction, and even in cases where ordinary lead only is provided a few opposing turns of this kind may be employed in order to effectually destroy the residual magnetism of the field.

My invention therefore comprises an electric booster provided with means for demagnetizing its field when the driving-motor ceases to operate.

It comprises also other features, the novelty of which will be hereinafter more fully described, and definitely indicated in the claims appended to this specification.

Figure 2:
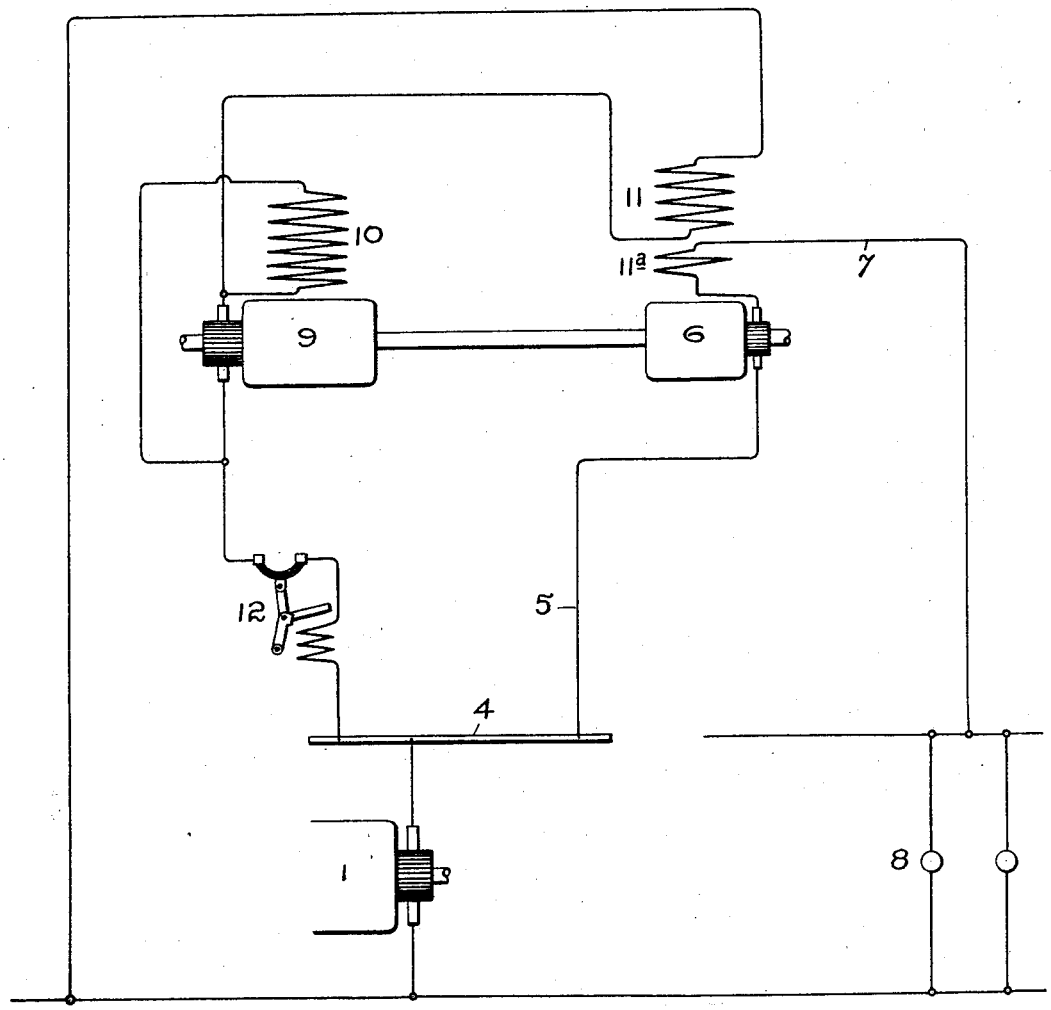

In the accompanying drawings, which illustrate my invention, Figure 1 is a diagram of a distribution system embodying one form of my improvements, and Fig. 2 is a similar diagram of a modified form.

Referring first to Fig. 1, 1 2 3 represent a bank of generators feeding in parallel to a distributing bus-bar 4 in a central station, and 5 a feeder in which is introduced a series electromotive device 6, such as the armature of a booster, which raises the potential of the feeder 5 to compensate for drop on the lead 7 due to increase of load in the section fed by said lead or the distance of the translating devices supplied by it. The system shown in the drawings is a railway distribution-circuit, 8 representing one of the translating devices. The booster is driven by a compound-wound motor, the armature 9 of which may be direct-connected with the booster-armature one branch of the field 10 being in shunt to the armature, the other branch $10^a$ being in series therewith, the two windings 10 $10^a$ being arranged to act together in magnetizing effect.

In series relation to the motor-armature I place the field-winding 11 of the booster, and in the driving-motor circuit I place an automatic circuit-breaker 12. A similar circuit-breaker 13 should be provided as is common in the feeder. By this arrangement of placing the booster-field in series with the motor-armature instead of in series with the generator-armature, as is the common plan, I overcome two difficulties. As the load increases upon the feeder 7 the increasing current in the motor-circuit sometimes trips the motor-circuit breaker before the feeder-circuit breaker, thus depriving the booster of its driving power, or some accident may occur to the motor by which it fails to operate. Under such circumstances the booster immediately reverses its direction of rotation in the system as commonly organized, and being of the series type the speed at which it runs is practically unlimited, and unless the attendant immediately opens the feeder-circuit the machine will be wrecked. In my arrangement, however, as will be seen, the opening of the motor-circuit breaker or the cessation of current in the motor-circuit from any cause kills the field of the booster and it comes to a standstill, its armature serving merely as a carrier of feeder-current. It will further be evident that the circuit-breaker 13 in the booster-circuit will always be in condition to open the circuit on overload during the operation of the booster and will still leave it closed when the booster-armature for any reason comes to a state of rest, thus continuing the supply of current to the translating devices supplied by the feeder, notwithstanding the booster is out of service. Another advantage offered by the system shown in Fig. 1 is that the booster-field is rendered more sluggish in its variations than when directly connected with the feeder-circuit, as the auxiliary compound winding on the driving-motor prevents surging, which would produce fluctuations in the booster-field and tend to increase sparking at the brushes. An auxiliary winding $10^a$ controls this, so as to prevent any rapid changes of speed in the driving-motor, and therefore renders the magnetization of the booster-field more constant.

The arrangement with simple separately-excited field (shown in Fig. 1) is limited in its application to places where the lead of the booster-brushes is small. In cases where a considerable lead is necessary I prefer to employ a few reverse turns in the booster-field, as indicated at $11^a$ in Fig. 2, connected in series with the feeder, being only enough to counteract the cross-magnetizing effect of the armature, due to lead of the brushes. A smaller demagnetizing effort may be provided in other cases where the brush lead is smaller to compensate for residual magnetism in the booster-field, though this prevention will in ordinary cases be found unnecessary. In Fig. 2 the load is shown as lamps or similar constant-potential translating devices; but my invention is generally applicable to all types of constant-potential systems.

Having thus described my invention, what I claim as new, and desire to secure by Letters Patent of the United States, is—

1. The combination of an electric circuit, a booster for varying its electromotive force, said booster being provided with a separately-excited field, and a driving-motor for the booster, the booster-field being dependent upon the operation of the motor.

2. The combination of an electric circuit, a booster for varying its electromotive force, and a driving electric motor for the booster, said booster being provided with a separately-excited field-magnet in circuit with the driving-motor.

3. The combination of an electric circuit, a booster for varying its electromotive force, said booster being provided with a separately-excited field, a driving electric motor in circuit with said field, and a demagnetizing-circuit for compensating the residual magnetism of the field-magnet.

4. The combination of an electric circuit, a booster for varying its electromotive force, said booster being provided with a separately-excited field, a driving electric motor in circuit with the field-winding, and a demagnetizing-winding on the field-magnet in series with the booster-feeder.

5. The combination of an electric circuit, a booster for regulating its electromotive force, having a separately-excited field-magnet, and a compound-wound motor for driving the booster, the booster field-winding being in series with the series field-winding of the motor.

6. The combination of an electric circuit, a booster for varying its electromotive force, said booster being provided with a separately-excited field, and a driving electric motor supplied by the circuit provided with a compound field-winding, the series coil of which is in circuit with the booster field-winding.

7. The combination with an electric circuit, of a main generator supplying said circuit, a booster connected in the circuit for varying its electromotive force, said booster having a separately-excited field, and an automatic circuit-breaker responsive to overloads in the feeder-circuit containing the booster.

In witness whereof I have hereunto set my hand this 31st day of May, 1901.

MERLE J. WIGHTMAN.

Witnesses:
R. H. BEACH,
J. J. MAHONY.